(12) United States Patent
Ebert

(10) Patent No.: US 6,863,145 B2
(45) Date of Patent: Mar. 8, 2005

(54) CLUTCH SHIELD

(75) Inventor: Russell Ebert, Lakeshore, MN (US)

(73) Assignee: Arctic Cat, Inc., Thief River Falls, MN (US)

( * ) Notice: Subject to any disclaimer, the term of this patent is extended or adjusted under 35 U.S.C. 154(b) by 44 days.

(21) Appl. No.: 10/269,703

(22) Filed: Oct. 10, 2002

(65) Prior Publication Data

US 2004/0069558 A1 Apr. 15, 2004

(51) Int. Cl.[7] .............................................. B60K 17/00
(52) U.S. Cl. ..................... 180/346; 180/190; 180/69.24
(58) Field of Search .................. 180/346, 190, 180/69.24; 296/37.1, 37.13; 49/465, 463; 220/835, 241, 242, 3.8

(56) References Cited

U.S. PATENT DOCUMENTS

| | | | | |
|---|---|---|---|---|
| 3,610,355 A | * | 10/1971 | Buck | 180/180 |
| 3,688,856 A | * | 9/1972 | Boehm et al. | 180/190 |
| 5,915,728 A | * | 6/1999 | Blackburn | 180/346 |
| 6,017,083 A | * | 1/2000 | Edgeller | 180/69.24 |
| 6,434,979 B1 | * | 8/2002 | Allen et al. | 70/14 |
| 6,561,297 B2 | * | 5/2003 | Yatagai et al. | 180/190 |
| 6,626,256 B2 | * | 9/2003 | Dennison et al. | 180/69.24 |

* cited by examiner

*Primary Examiner*—Paul N. Dickson
*Assistant Examiner*—Joselynn Y. Sliteris
(74) *Attorney, Agent, or Firm*—Merchant & Gould P.C.

(57) ABSTRACT

Generally, the present invention relates to a shield for a belt-driven clutch system of a snowmobile having a shield portion and a pivot portion that is angled nonperpendicular relative to the shield portion. One embodiment of the invention is a clutch shield assembly with a first (shield) portion having first and second ends, and a second (pivot) portion with a pivot point that is formed at the first portion first end and that extends at an angle nonperpendicular relative to the first end of the first portion. The shield is pivotally mounted to the vehicle at the pivot point and rotates between a first position covering the clutch and a second position removed from the clutch. Further, an attachment portion releasably secures the first portion second end to the vehicle.

13 Claims, 2 Drawing Sheets

CLUTCH SHIELD

BACKGROUND OF THE INVENTION

1. Field of Invention

The invention relates generally to motorized vehicles having a clutch. More particularly, the invention relates to motorized track-driven vehicles, such as snowmobiles, that utilize clutches for a continuously variable transmission.

2. Prior Art

Vehicles use a wide variety of transmissions for vehicle propulsion. A type of transmission widely used in smaller vehicles, e.g., snowmobiles, go karts and all-terrain vehicles (ATVs), is an endless belt transmission; often referred to as a continuously variable transmission (CVT). In a CVT, both outward torque and speed varies substantially continuously, i.e., without gearshifts, over the entire speed range of the engine. A CVT typically includes a driving clutch with a shaft that is coaxial with the output shaft of the vehicle's engine. The driving or primary clutch includes a stationary sheave and a movable sheave that together define a pulley around which a transmission belt travels. The belt also travels around a driven or secondary clutch that transfers power from the driven clutch to the vehicle track or wheels. The driven clutch also includes a stationary sheave and a movable sheave that define a pulley.

Continuously variable transmissions typically are operated at high RPMs. As a result, the area around the drive and driven clutches and the transmission belt is hazardous and is therefore covered to prevent inadvertent contact by a person or object. Clutch shields are commonly used for covering clutch and belt components of a CVT. Known clutch shields generally include a piece of sheet metal formed to cover a portion of the CVT and are secured to the vehicle frame with removable fasteners or hinges that allow the shield to be temporarily moved out of the way while accessing the CVT. A disadvantage of many clutch shields is that the shield is awkward or time consuming to remove because of the fasteners that are used to attach the shield to the vehicle. A disadvantage of clutch shields that are hinged to the vehicle is that the shield moves in only one plane of motion, and as a result, moves into an inconvenient position or does not move far enough out of the way to easily access the CVT.

SUMMARY OF THE INVENTION

The present invention relates to a shield for a belt-driven clutch system of a vehicle having a shield portion and a pivot portion that is angled nonperpendicular relative to the shield portion. One embodiment of the invention is a clutch shield assembly with a first (shield) portion having first and second ends, and a second (pivot) portion formed at the first portion first end that includes a pivot point. The second portion is angled nonperpendicular relative to the first portion first end. The shield is pivotally mounted to the vehicle at the pivot point of the second portion and rotates between a first position covering the clutch and a second position removed from the clutch. Further, an attachment portion releasably secures the first portion second end to the vehicle.

The above summary of the present invention is not intended to describe each disclosed embodiment or every implementation of the present invention. The figures and the detailed description that follows more particularly exemplify these embodiments.

BRIEF DESCRIPTION OF THE DRAWINGS

The invention may be more completely understood in consideration of the following detailed description of various embodiments of the invention in connection with the accompanying drawings, wherein like numerals represent like parts throughout several views, in which.

Figure 1:
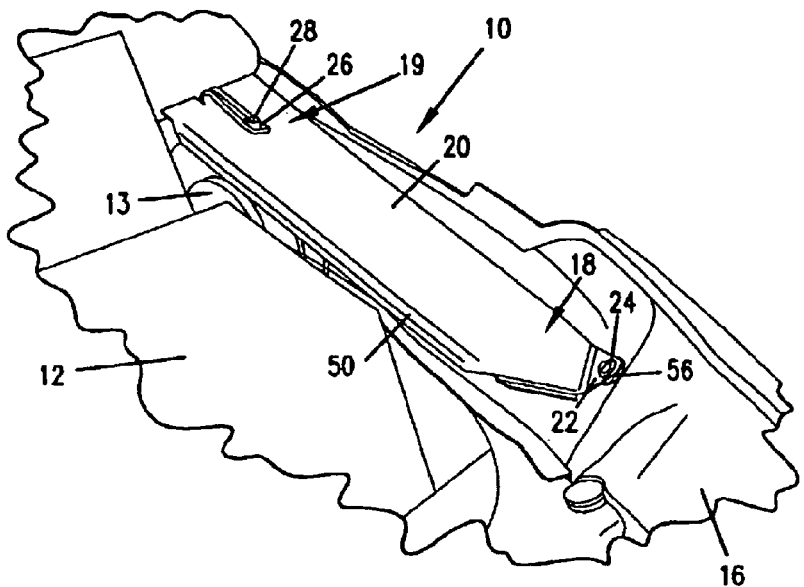
FIG. 1 is a perspective view of a snowmobile clutch shield assembly in a closed position, according to the invention.

While the invention is amenable to various modifications in alternative forms, the specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to clutch shields, for example, clutches for a variable speed belt drive transmission of a vehicle. In particular, the present invention is directed to a clutch shield assembly that includes a pivot portion of the shield that is angled nonperpendicular relative to a first end of a shield portion of the shield and includes a pivot point about which the shield rotates. Rotation of the shield about the pivot point causes the shield to move from a closed position (covering the clutch) to an open position (removed from the clutch). An attachment mechanism secures the shield to the vehicle when the shield is in the closed position.

Figure 2:
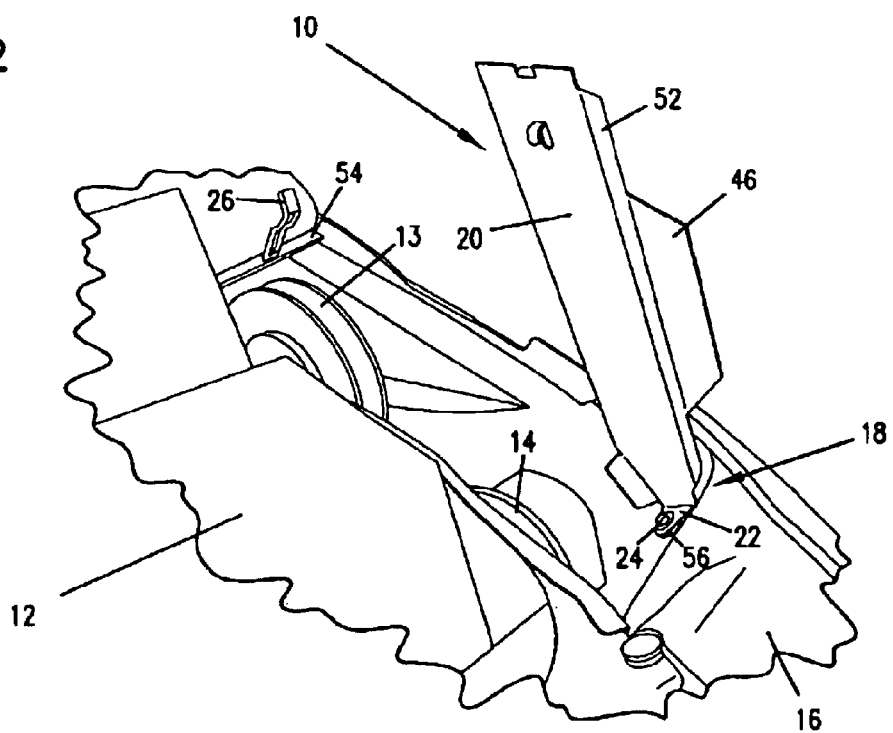
FIG. 2 is a perspective view of the snowmobile clutch shield assembly of FIG. 1 in an open position.

In particular, the present invention is directed to a clutch shield assembly 10 shown in FIGS. 1 and 2. Clutch shield assembly 10 includes a first portion 20 having a first end 18 and a second end 19, and a second portion 22 formed at the first end that extends at an angle nonperpendicular relative to the first end. The second portion includes a pivot point 24. The shield is pivotally mounted to the vehicle at pivot point 24 so that the shield rotates between a first (closed) position covering the clutch and a second (open) position removed from the clutch. The clutch shield assembly also includes an attachment portion 26 that releasably secures the first portion second end to the vehicle.

One example of clutch shield assembly 10 of the present invention is shown in FIGS. 1 and 2. Clutch shield 10 covers vehicle clutch components 13 and 14 that are powered by a vehicle engine 12. The clutch shield, engine and clutch components are secured to a vehicle chassis 16, as illustrated in FIGS. 1 and 2. FIG. 1 illustrates clutch shield 10 in a closed position where it is covering clutch components 13 and 14 and other components of the vehicle's continuously variable belt transmission. Clutch shield assembly 10 is secured to chassis 16 of the vehicle at pivot point 24 of second portion 22, and via attachment portion 26 that engages an attachment protrusion 28 on first portion 20.

In the open position illustrated in FIG. 2, clutch shield assembly 10 has rotated about pivot point 24 of second portion 22 into an open position so that clutch components 13 and 14 are exposed and accessible. Clutch shield assembly 10 may be pivotally secured to chassis 16 at pivot point 24 in a generally forward position on the vehicle relative to attachment portion 26. Thus, as clutch shield assembly 10 rotates from the closed position illustrated in FIG. 1 to the open position of FIG. 2, the shield moves from a more rearward position on the vehicle to a generally front oriented position on the vehicle. In other embodiments, pivot point 24 may be positioned rearward on the vehicle relative to the attachment portion 26 so that the shield has a generally rear oriented position on the vehicle relative to the attachment portion when in the open position.

Figure 3:
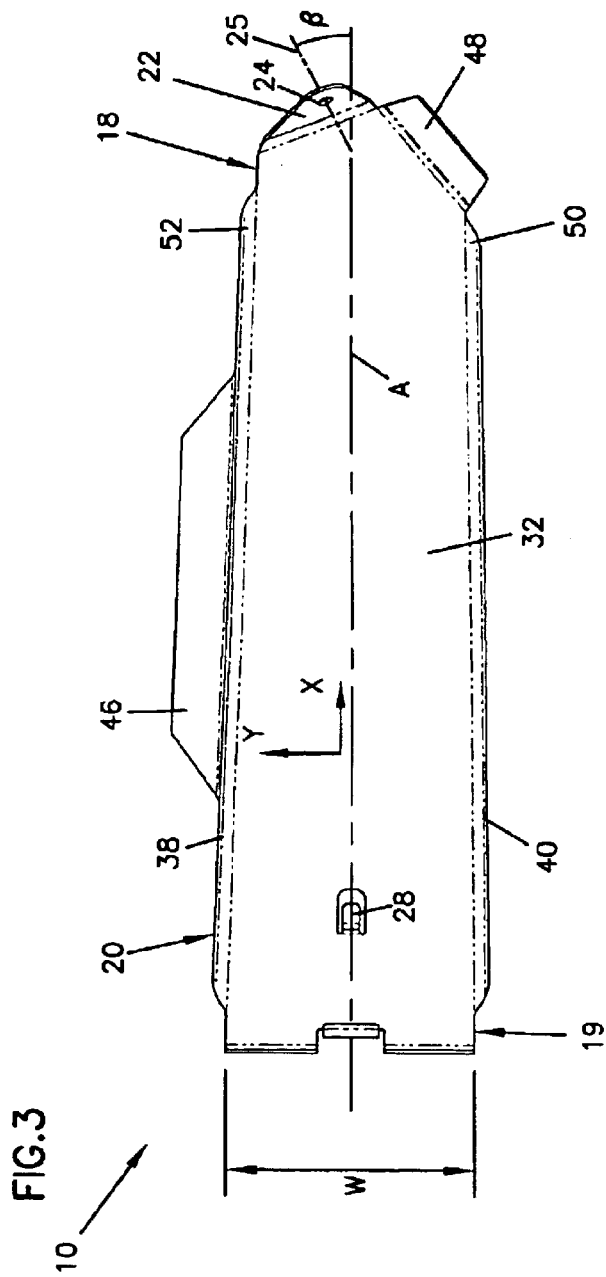
FIG. 3 is a schematic top view of the clutch shield of FIG. 1.
Figure 4:
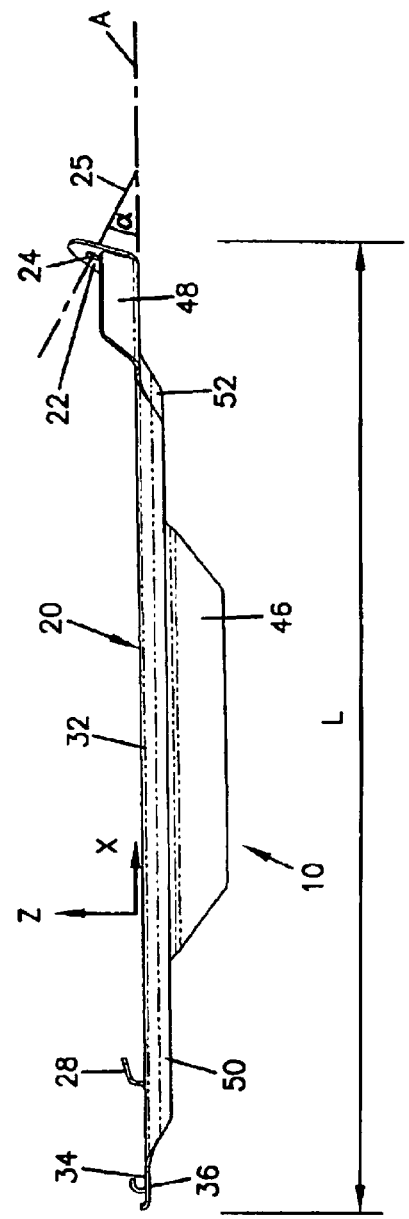
FIG. 4 is a schematic side view of the clutch shield of FIG. 1.

Clutch shield assembly 10 is further illustrated and described with regard to the top and side views of FIGS. 3 and 4. The first (shield) portion 20 of clutch shield assembly 10 has a base member 32 with a length L and a width W, a top surface 34, a bottom surface 36, a first side 38, a second side 40, a first end 18, and a second end 19. First portion 20 also may include several flanges for further covering the clutch components 14, for example, first flange 46 formed on first side 38, second flange 48 formed near first end 18, third flange 50 formed on second side 40, and fourth flange 52 formed on first side 38. In this embodiment, flanges 46, 50 and 52 extend downward relative to bottom surface 36 of first portion 20, while flange 48 extends generally upward from top surface 34. In alternative embodiments, flanges 46, 48, 50 and 52, and any additional or fewer flanges that may be necessary for a particular shield design, may be oriented and sized to meet the particular covering or shielding requirements for a given CVT. For example, flanges 46, 48, 50 and 52 may extend at an angle greater or less than a 90 degree angle from surfaces 34 and 36. As shown in FIGS. 1, 3 and 4, flange 50 extends approximately 90 degrees from bottom surface 36, while flange 46 extends at an angle greater than 90 degrees.

Attachment portion 26 extends from chassis 16 and assists in holding clutch shield assembly 10 in the closed position by engaging attachment protrusion 28. When attachment portion 26 engages attachment protrusion 28, the second end 19 of first portion 20 is constrained from vertical movement.

In this embodiment, attachment protrusion 28 is a generally L-shaped protrusion that extends upward from top surface 34 of first portion 20. The L shape forms a hook that engages a slot formed in attachment portion 26. Attachment member portion 26 may be made of a rubber or other flexible material that creates tension forces downward upon second end 19 to hold clutch shield assembly 10 in place. In alternative embodiments, alternative structures for securing second end 19 to vehicle chassis 16 may be used. For example, assembly 10 may include an additional flange member at second end 19 that is configured to snap-fit over end 54 of chassis 16. In another embodiment, attachment portion 26 may be fixed to first portion 20 and removably engages an attachment protrusion mounted on chassis 16.

The illustrated embodiment provides an advantage of being a quick release attachment device that provides some shock absorption due to the properties and design of the features used to secure the shield to the vehicle chassis. An additional or alternative feature that may add shock absorption is, for example, a shock absorbing material positioned across end 54 on a surface that engages bottom surface 36. In this arrangement, the shock absorbing material may be combined with a fastener that extends through second end 19 into chassis 16, with the fastener including some type of quick release mechanism or mechanical attachment feature such as, for example, an over-center mechanical fastener or a cam-over mechanical fastener.

Typically, the majority of base member 32 of first portion 20 extends in a single plane and is defined by upper and lower surfaces 34 and 36. FIG. 3 illustrates base member 32 of first portion 20 extending in a plane defined by the X-Y coordinates. Typically, first portion 20, except for flanges 46, 48 and 50 and attachment protrusion 28, extends only in the X, Y plane and does not protrude in the Z direction when in the closed position (see FIGS. 3 and 4). Known clutch shields, in particular those that are secured to a vehicle chassis with a hinge mechanism, move between open and closed positions while maintaining the same relative planar orientation throughout the movement. In the present invention, the first portion moves through different planes during its movement from closed to open positions.

FIGS. 1–4 illustrate clutch shield assembly 10 having a second (or pivot) portion 22 formed at first end 18 of first portion 20. Second portion 22 includes a pivot point 24 with a pivot axis 25 extending through the pivot point generally perpendicular to the direction second portion 22 extends from first portion 20. The direction in which axis 25 extends may also be defined by angle $\alpha$ (see FIG. 4) that is measured relative to the direction in which first portion 20 extends between first end 18 and second end 19 (represented by line A in FIGS. 3 and 4). The angle $\alpha$ is measured by projecting axis 25 onto the X-Z plane and measuring the angle of axis 25 relative to the X axis. The angle $\alpha$ is less than 90 degrees and preferably about 45 degrees.

The direction in which axis 25 extends may also be represented by angle $\beta$ (see FIG. 3) that is also measured relative to the direction of line A. The angle $\beta$ is measured by projecting axis 25 onto the X-Y plane and measuring the angle of axis 25 relative to the X axis. The angle $\beta$ is less than 90 degrees and preferably about 45 degrees.

FIGS. 1 and 2 illustrate second portion 22 secured to chassis 16 with a fastener that extends through chassis 16 into an aperture formed in second portion 22 at pivot point 24. Clutch shield assembly 10 is able to pivotally move about a shaft of the fastener between the closed and open positions illustrated in FIGS. 1 and 2. A suspension member 56 may be interposed between chassis 16 and second portion 22 at pivot point 24. Suspension member 56 provides suspension between the clutch shield assembly and the chassis to help reduce vibrations during vehicle use while allowing clutch shield assembly 10 to rotate between closed and open positions. Suspension member 56 may be, for example, a grommet, washer, spring or the like that is made of any of a variety of materials that provides some suspension.

Another relevant aspect to the configuration and design of second portion 22 is the angle of a surface of chassis 16 to which second portion 22 is mounted. As illustrated in FIGS. 1 and 2, chassis 16 is slanted or angled relative to the X-Y plane of first portion 20 when in the closed position. Typically, second portion 22 is oriented substantially parallel to the surface of the chassis against which it mates so that clutch shield assembly 10 may move through a predictable angle between closed and open positions.

In the embodiment of FIGS. 1–4, first portion 20 has a base member 32 that is rectangular in shape and substantially planar. In other embodiments, base member 32 may have a curved shape in the X-Y plane and may be contoured in the Z direction to cover specific portions of a vehicle clutch. First portion 20 and second portion 22 may be formed from a single piece of material, for example by stamping or bending a single piece of sheet metal. In other embodiments, base member 32 may be formed separately and flanges 46, 48, 50, and 52, attachment protrusion 28, and second portion 22 may be secured to base member 32 with fasteners, welding, adhesives, or other ways of attaching members together. Clutch shield assembly 10 may be made of metal alloy, aluminum, composites, ceramics, steel, polymer materials or other appropriate material.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A clutch shield assembly for covering a clutch of a snowmobile power transmission, comprising:

a first portion having a first end and a second end;

a second portion formed at the first portion first end, extending at an angle relative to the first portion first end, and comprising a pivot point; and an attachment portion releasably securing the first portion second end to a chassis of the snowmobile;

whereby the shield is pivotally mounted to the chassis at the pivot point and rotates between a first position covering the clutch and a second position removed from the clutch.

2. The clutch shield assembly of claim 1 wherein the first portion includes a base member and a flange member, and the base member is substantially planar.

3. The clutch shield assembly of claim 2 wherein the first portion comprises first and second sides, and a first flange member is formed along the first side and a second flange member is formed along the second side.

4. The clutch shield assembly of claim 3 wherein a third flange member is formed at the first end of the first portion.

5. The clutch shield assembly of claim 3 wherein the flange members extend in an angled direction relative to a plane of the base member.

6. The clutch shield assembly of claim 3, wherein in the first position, the shield is positioned in three planes defined by X, Y and Z axes, and in the second position, the shield is in three planes different from those planes of the first position.

7. The clutch shield assembly of claim 1 wherein the attachment portion comprises an attachment protrusion formed in the first portion and a locking member secured to the snowmobile that is releasably secured to the attachment protrusion to hold the shield in the first position.

8. The clutch shield assembly of claim 1 wherein the second portion extends at an obtuse angle relative to the first portion first end.

9. The clutch shield assembly of claim 1 wherein the second portion is secured to the chassis with a fastener and rotates about a shaft of the fastener.

10. The clutch shield assembly of claim 9, wherein an elastomeric cushion member is interposed between the second portion and the chassis and surrounds a portion of the fastener.

11. The clutch shield assembly of claim 1 wherein the second portion is substantially parallel to a portion of the chassis to which the second portion is secured.

12. A snowmobile, comprising:

an engine;

a frame;

a transmission powered by the engine and comprising a clutch; and the clutch shield assembly of claim 1 secured to the frame of the snowmobile.

13. A snowmobile clutch system, comprising:

a clutch for a continuously variable belt drive transmission; and the clutch shield assembly of claim 1 covering a portion of the clutch.

* * * * *